April 15, 1969  V. R. CAMPBELL  3,438,655

FLUID PRESSURE COUPLING

Filed Sept. 27, 1967  Sheet 1 of 2

INVENTOR
VERNON R. CAMPBELL
BY
  Burton & Parker
  ATTORNEYS

INVENTOR
VERNON R. CAMPBELL
BY
Burton & Parker
ATTORNEYS

United States Patent Office 3,438,655
Patented Apr. 15, 1969

3,438,655
FLUID PRESSURE COUPLING
Vernon R. Campbell, Berkley, Mich., assignor to L & L Manufacturing Company, St. Clair Shores, Mich., a corporation of Michigan
Filed Sept. 27, 1967, Ser. No. 670,931
Int. Cl. F16l 21/00, 25/00, 13/14
U.S. Cl. 285—158                    5 Claims

ABSTRACT OF THE DISCLOSURE

This disclosure relates to a fluid pressure coupling adapted to connect a fluid line or tube directly into an internally threaded port. The leading end of the coupling body, which receives the tube, is provided with a biting ring, and the threaded portions of the body and port have an interference fit which biases the leading end of the body into sealing contact, and the ring into biting contact with the tube.

---

The prior art includes a number of tube couplings having a metal biting ring. Examples of such couplings include the following United States patents: 2,064,140, 2,127,284, 2,475,741, 2,566,769, 2,585,453, 2,613,086, 2,787,479. Of these patents, only United States Patent No. 2,127,284 illustrates a tube coupling adapted to secure a tube directly within an internally threaded bore, however the coupling requires an elastomeric gasket 28 which is subject to deterioration and does not provide the advantages of my invention. The remaining couplings are not adapted to directly connect a tube in an internally threaded port, and are not designated to provide the advantages of my invention.

French Patent No. 1,025,713 teaches the use of a slotted jamming nut which is received in a tapered threaded female tube coupling, which jams the leading end of the screw against the exterior of a tube. The jamming nut or screw is not intended to provide sealing engagement, as the nut is provided with four slots and the seal is provided by a gasket within the housing, but merely retains the tube in the coupling. Further the coupling is considered too complex for commercial use.

Briefly, the coupling of my invention includes a coupling body having a male threaded leading end adapted to be threadably received within an internally threaded port, and a metallic biting ring which is received within an annular opening defined within the tube receiving bore of the coupling body, adjacent the leading end. The coupling body and the biting ring are initially spaced from the external diameter of the tube, and the internally threaded bore and the male threaded leading end of the coupling body have an interference fit which biases the leading end of the coupling body into sealing engagement, and the ring into biting engagement with the tube. In the preferred embodiment, the sealing engagement of the leading end of the coupling body, and the biting engagement of the ring occur substantially entirely within the internally threaded port, such that the sealing and biting engagement are relatively unaffected by vibration and impact of the tube.

According to one embodiment of my invention disclosed herein, the internally threaded port, and the male threaded leading end of the coupling body are tapered at an acute angle relative to their common axis; such that the leading end of the coupling body is contracted radially as the body is threaded into the internally threaded port. The dimensions of the coupling are chosen to provide full sealing engagement of the leading end of the coupling body when the body is substantially fully threaded into the coupling bore. According to the second embodiment only one of the members is tapered, relative to the common axis between the body and the port, to provide the thread interference. Either the male threaded leading end, or the threaded port may be tapered. According to the third embodiment disclosed of my invention, both of the threaded portions are straight, and one of the threaded portions, preferably the male threaded leading end, is provided with a bulge which provides the requisite thread interference.

The direct tube coupling of this invention provides an extremely simple means of connecting a fluid conduit to a housing, body, or fitting, with the fewest possible elements to assure adequate sealing and retention against fluid and mechanical forces. The coupling is simple to connect and relatively inexpensive. The coupling is light in weight and is relatively free of fluid flow restrictions.

Other advantages, and meritorious features of this invention will more fully appear from the following specification, claims, and accompanying drawings, wherein:

The fluid pressure coupling of my invention is capable of handling a wide variety of fluids, including relatively caustic fluids, at high temperatures and pressures without deterioration. For example, the coupling body may be metallic or a metal alloy, such as carbon steel, stainless steel; or may be formed from a relatively resilient metal, such as treated auminum, brass, or zinc. The resilient metals may be preferred where the coupling is to be re-used, because of the radial deformation of the leading end of the coupling body during sealing of the tube. Where relatively non-resilient materials are used, such as steel, a thread sealant may be preferred to prevent spiral leakage through the threads, especially in high pressure systems.

The coupling of my invention is also suitable for use in plastic couplings, wherein the coupling body may be formed from such materials as nylon, Delrin, polycarbonates, or phenolic resins. The use of plastic for the coupling body may be preferred when plastic tubing is to be secured to a port.

Figure 1:
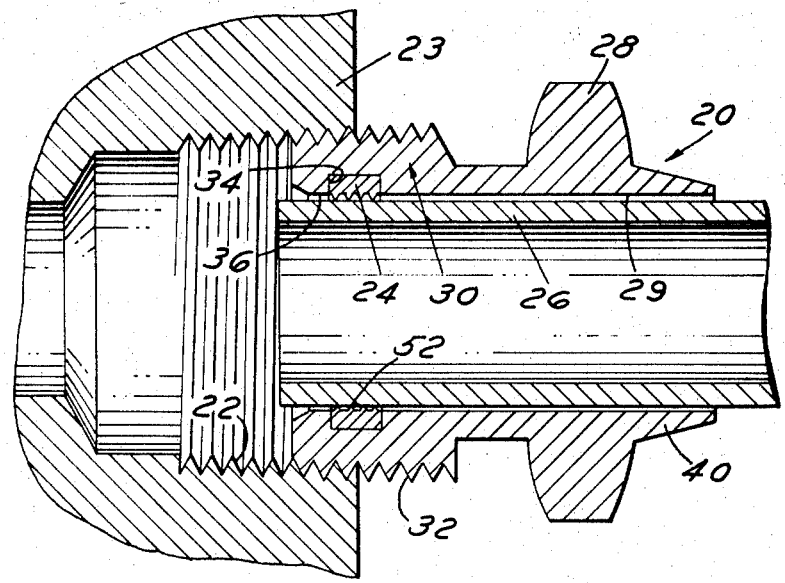
FIGURE 1 is a cross-sectional view of one embodiment of the fluid pressure coupling of this invention, prior to tightening of the body in the internally threaded bore.
Figure 2:
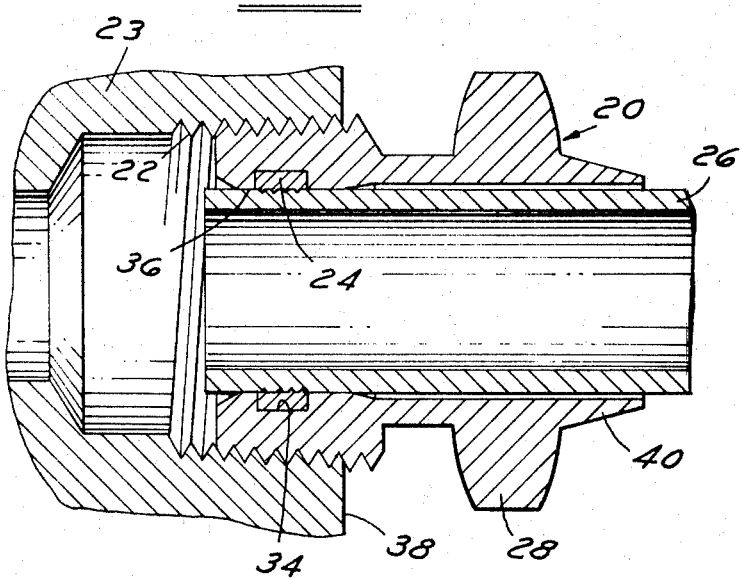
FIGURE 2 is a cross-sectional view of the embodiment shown in FIGURE 1, after the coupling body has been fully tightened in the internally threaded port.

The embodiment of the fluid pressure coupling of my invention shown in FIGURES 1 and 2 includes a coupling body 20, adapted to be received in an internally threaded port 22 in a member 23, a biting ring 24, and a tube or conduit 26.

The threaded port 22 represents a fluid connection in various systems, such as a hydraulic panel, valve, pump or cylinder. The coupling body may be provided with a wrench engaging portion 28 for enabling connection of the body to various fluid conveying systems, and may be hexagonal in cross-section for this purpose.

The coupling body has a tube receiving bore 29 adapted to receive the tube 26 in spaced relation. The forward or leading end 30 of the coupling body has a male thread 32 adapted to be received in the threaded port 22, as described hereinafter, and the biting ring 24 is received in an annular opening or slot 34 defined in the coupling body bore 29, adjacent the leading end.

The tube or conduit 26 in this embodiment of my invention is received directly in the internally threaded bore 22, in contradistinction to conventional tube-to-port couplings, wherein the tube is secured in a counterbore in the coupling body, or secured to the opposed end of the body.

The complementary threaded portions 22 and 32 of the couplings of my invention have an interference fit which contracts or biases the leading end of the coupling 30 radially, toward the tube, as the body is threaded into the port 22. In this embodiment, the coupling body and the port threads are tapered at an acute angle, relative to the common axis, to bias the body toward the tube. It can be seen from FIGURE 1 that the coupling body 20 and the ring 24 are initially spaced from the exterior of the tube 26, and the leading end 30 of the body is biased into sealing engagement with the tube, as shown in FIGURE 2, as the body is threaded into the bore 22. The tube is simultaneously secured in the port as the biting ring is contracted into biting engagement with the exterior of the tube.

It should be obvious to those skilled in the art that the coupling of my invention is suitable for use with tubing of a wide variety of materials and thicknesses, including carbon steel, stainless steel, aluminum, copper, brass, etc. The coupling is suitable for light and heavy wall tubing because the coupling is not affected by the thickness of the tube.

It should be noted that the sealing engagement between the leading end 30 of the coupling and the tube, and the biting engagement provided by the ring 24 is located substantially entirely within the port 22. The sealing engagement, as provided by compression of the leading end of the coupling against the tube, is greatest at the forward end 36, and diminishes to the end of the port 38. The deformation of the leading end may be resilient, where resilient materials are used such as treated aluminum or various resilient plastics, and may be permanent where less resilient materials are used. The advantage of locating the sealing and securement means within the port is that the resultant coupling is less subject to vibrational and other forces through the tube, or conduit system. In the more conventional coupling bodies, adapted to be secured within a port, the body is adapted to seal against the exterior surface of the member 38, or a beveled surface adjacent the port. In these embodiments, the coupling body may be urged out of sealing engagement with the tube by vibrational or other forces. The coupling body of this embodiment is provided with an axial extension 40 which aids in support of the tube under vibrational forces.

Figure 3:
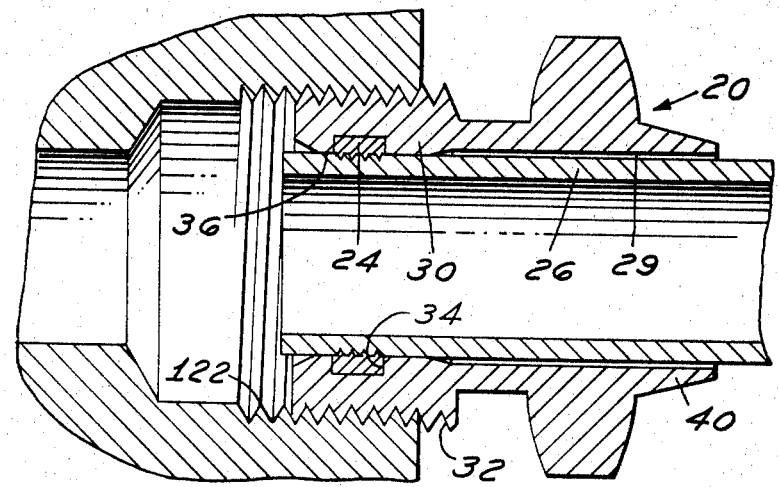
FIGURE 3 is a cross-sectional view of another embodiment of my invention.

The embodiment of the fluid pressure coupling of my invention shown in FIGURE 3 is identical to the embodiment shown in FIGURES 1 and 2, except that only one of the threaded portions have been tapered to provide the requisite thread interference. In this embodiment, the internally threaded port 122 is provided with a straight thread, and the leading end 30 of the coupling body is provided with tapered threads 32 which provide the thread interference for biasing the leading end into sealing engagement with the tube 26. The coupling body 20 is thus equally adaptable to pipe threaded and straight threaded ports, without modification of the coupling body. It will be understood by those skilled in the art, however, that a straight threaded coupling body may be used in conjunction with a tapered, or pipe threaded port, as shown at 22 in FIGURE 1, without departing from the purview of my invention. The remaining details of the embodiment of FIGURE 3 may be identical to the embodiment shown in FIGURES 1 and 2, and have been numbered accordingly.

Figure 4:
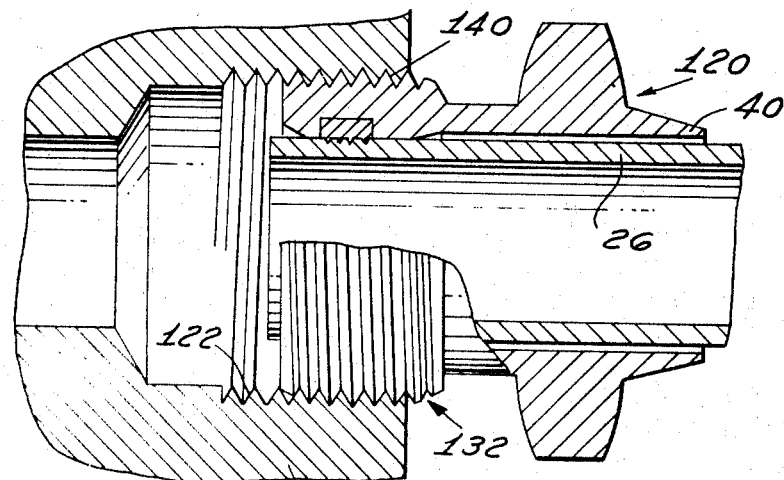
FIGURE 4 is a cross-sectional view of another embodiment of my invention.

The embodiment of the fluid pressure coupling of my invention shown in FIGURE 4 is similar to the embodiments of FIGURES 1 to 3, except that the biasing thread interference is provided by a bulge 140 on the male threaded end 132 of the coupling body. The port 122 is provided with straight internal threads, as shown in FIGURE 3, and the thread interference is caused by the male thread bulge. The bulge, or increased diameter adjacent the midportion of the threads, is preferably provided on the male threads 132 because of the greater ease of manufacture. However, it will be understood by those skilled in the art, that such a bulge could also be provided on the female thread 122. The various details of the embodiment of FIGURE 4 may otherwise be similar to the embodiments shown in FIGURES 1 to 3, and have been numbered accordingly.

Figure 6:
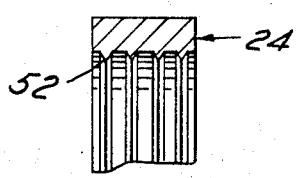
FIGURE 6 is a cross-sectional view of the biting ring shown in FIGURE 5, in the direction of view arrows 6—6.
Figure 5:
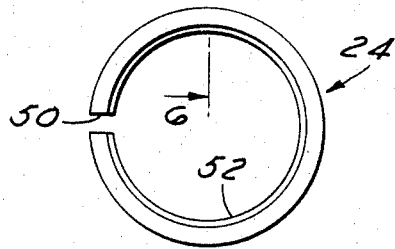
FIGURE 5 is an end view of one embodiment of the biting ring utilized in FIGURES 1 to 4.

FIGURES 5 and 6 illustrate one embodiment of the biting ring 24, which has been split at 50 to permit receipt of the ring in the annular slot 34. The biting ring is preferably formed of a material which is harder than the tube 26 to assure biting engagement therebetween, and therefore may be formed from carburized low carbon steel, or heat treated high carbon steel. The ring is provided with a plurality of radially extending teeth 52 for biting engagement with the exterior surface of the tube. In the preferred embodiment of the ring, the teeth extend circumferentially perpendicular to the axis of the ring, rather than spirally, to prevent spiral leakage through the ring in high pressure systems. A thread sealant may also be utilized between the threads on the leading end of the coupling body and the internally threaded port to prevent spiral leakage, especially in high pressure systems.

It will be understood by those skilled in the art that various modifications may be made to the embodiments disclosed. For example, a continuous biting ring may be substituted for the slotted ring 24 shown in FIGURES 5 and 6, with slight modification to the coupling body. Further, the fluid pressure coupling may be modified to flare plastic or thin wall metal tubing by providing a conical insert in the port; which may rest against a shoulder near the inner end of the port, or may have its widest outer diameter threaded to engage the threads of the port near the inner end. The purpose of a flaring cone is not only to support the end of the tube, and prevent its collapse; but also to provide a means of flaring the tube to provide a clamping action at the end of the tube, in addition to the gripping action of the biting insert. The biting insert may also be tubular, with or without ridges or beads on the external surface, to support and grip the external diameter of the tube.

According to another embodiment of my invention, not shown, the biting ring 24 is received in a counter bore in the leading end of the coupling body, rather than the slot 34 shown. To facilitate sealing of the leading end of the coupling body against the tube, and retention of the biting ring 24, a malleable ring having a low modulus of elasticity is provided between the biting ring and the leading end of the body, in the counterbore. The additional ring serves the purpose of the forward end 36 and the coupling body, and may have a force fit with the counterbore to insure retention of the biting ring 24.

What is claimed is:

1. A fluid pressure coupling, comprising: a member having an itnernally threaded port, a tube coupling body encircling a tube received in said threaded port having a peripherally continuous male threaded leading end threadably received in said internally threaded port, and a biting ring encircling said tube received in an annular groove defined in said coupling body adjacent said leading end having radially inwardly projecting biting means for biting engagement with said tube, said leading end of said body initially spaced from the external diameter of the tube, one of said male or female threaded members being so constructed and arranged that upon mating engagement a sequential deformation of said male member is caused to occur from the leading end thereof rearwardly and beyond said ring member and thereby causing, first an initial engagement between said ring and said tube, second a metal-to-metal seal between said leading end of said coupling body and said tube, followed by a metal-to-metal seal at said rearward portion, the internal diameter of said tube coupling body approximately equal to the internal diameter of said biting ring at the base of said biting means.

2. The fluid pressure coupling defined in claim 1, characterized in that said sealing engagement and said biting engagement occurs substantially within said internally threaded port such that they are relatively unaffected by vibration of said tube.

3. The fluid pressure coupling defined in claim 1, characterized in that said internally threaded port and said male threaded leading end are each tapered at an acute angle relative to their common axis such that said leading end is biased into sealing contact with said tube when said leading end is substantially fully threaded into said internally threaded port.

4. The fluid pressure coupling defined in claim 1, characterized in that one of the threaded portions of said port and said coupling body is tapered and the other is straight relative to their common axis such that the thread interference causes the biasing of said leading end.

5. The fluid pressure coupling defined in claim 1, characterized in that said internally threaded port and said male threaded leading end are straight threaded relative to their common axis, and one of their threaded portions has a bulge adjacent the midportion causing said interference fit.

References Cited

UNITED STATES PATENTS

| | | | |
|---|---|---|---|
| 371,231 | 10/1887 | Turner | 285—243 |
| 2,037,812 | 4/1936 | McKendrick | 285—384 |
| 2,383,692 | 8/1945 | Smith | 285—334.4 |
| 2,479,058 | 8/1949 | Botting | 285—232 |
| 2,613,086 | 10/1952 | Wolfram | 285—232 |
| 3,322,890 | 5/1967 | Kennedy et al. | 285—158 |

MARION PARSONS, JR., *Primary Examiner.*

W. L. SHEDD, *Assistant Examiner.*

U.S. Cl. X.R.

285—232, 334.4, 382.4